United States Patent
Shin (10) Patent No.: US 8,054,748 B2
(45) Date of Patent: Nov. 8, 2011

(54) HOME-NETWORK AND METHOD FOR ALLOCATING CHANNEL THEREOF

(75) Inventor: Dong-yun Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 11/356,401

(22) Filed: Feb. 17, 2006

(65) Prior Publication Data
US 2006/0182116 A1 Aug. 17, 2006

(30) Foreign Application Priority Data
Feb. 17, 2005 (KR) .................. 10-2005-0012980

(51) Int. Cl.
*H04W 72/00* (2009.01)
(52) U.S. Cl. ............ 370/235; 455/403; 455/422.1; 455/450; 455/452.1; 709/230; 709/236
(58) Field of Classification Search .......... 370/229, 370/235–240, 464, 468; 455/403, 422.1, 455/450, 452.1; 709/230, 236
See application file for complete search history.

(56) References Cited

U.S. PATENT DOCUMENTS

| | | | |
|---|---|---|---|
| 6,201,834 B1 * | 3/2001 | Zhu | 375/240.27 |
| 6,526,446 B1 * | 2/2003 | Yang et al. | 709/230 |
| 2002/0087716 A1 * | 7/2002 | Mustafa | 709/236 |
| 2002/0099900 A1 * | 7/2002 | Kawarai et al. | 710/317 |
| 2004/0082364 A1 | 4/2004 | Kitazawa et al. | |
| 2005/0135308 A1 * | 6/2005 | Vijayan et al. | 370/330 |
| 2006/0171353 A1 * | 8/2006 | Nagata et al. | 370/329 |
| 2006/0251028 A1 * | 11/2006 | Nagata et al. | 370/338 |

FOREIGN PATENT DOCUMENTS

| | | | |
|---|---|---|---|
| JP | 2004140604 A | 5/2004 | |
| JP | 2005033398 A | 2/2005 | |
| KR | 10-2004-0071139 A | 8/2004 | |
| KR | 10-2004-0072868 A | 8/2004 | |
| KR | 10-2004-0090442 A | 10/2004 | |

* cited by examiner

Primary Examiner — Hassan Kizou
Assistant Examiner — Charles C Jiang
(74) Attorney, Agent, or Firm — Sughrue Mion, PLLC (57) ABSTRACT

A home-network and a method for allocating channels are provided. The home-network includes a buffer having queues and temporarily storing a data to be transmitted to each device, a priority sense part determining if the data of a packet unit transmitted from an outer server has a high priority for transmission and first inputting the data with a high priority into the queue of the buffer, a frame sense part sensing how many packets are included in one frame of the data stored in the buffer, and a channel allocation part allocating channels if enough channels are available for the transmission of a whole frame according to the number of packets sensed by the frame sense part. Accordingly, it is possible to reduce a delay time of wireless data, and channels are allocated according to the order of receipt of the data such that all devices perform equally.

17 Claims, 6 Drawing Sheets

HOME-NETWORK AND METHOD FOR ALLOCATING CHANNEL THEREOF

This application claims the benefit of Korean Patent Application No. 10-2005-0012980 filed on Feb. 17, 2005, in the Korean Intellectual Property Office, the disclosure of which is incorporated herein by reference.

BACKGROUND OF THE INVENTION

1. Technical Field

Systems and methods consistent with the present invention relate to a home-network and a method for assigning channels thereof, and more particularly, to a home-network that can offer improved image quality and performance of each device by adaptively allocating channels to each device depending on the sizes of frames in receiving, and a method for allocating channels thereof.

2. Related Art

In a related art home-network system, a home-network receives data from an external server. Among the data, multimedia data such as a moving picture is compressed into a frame unit, and the compressed data of frame unit is packetized into an Internet Protocol (IP) unit according to its capacity so as to be transmitted via IP network. Each compressed frame has different capacity according to a compression method, degree of movement of image, degree of association with the previous frames, and audio insertion. Accordingly, each frame may consist of a small or large number of packets according to its compressed size.

Figure 1:
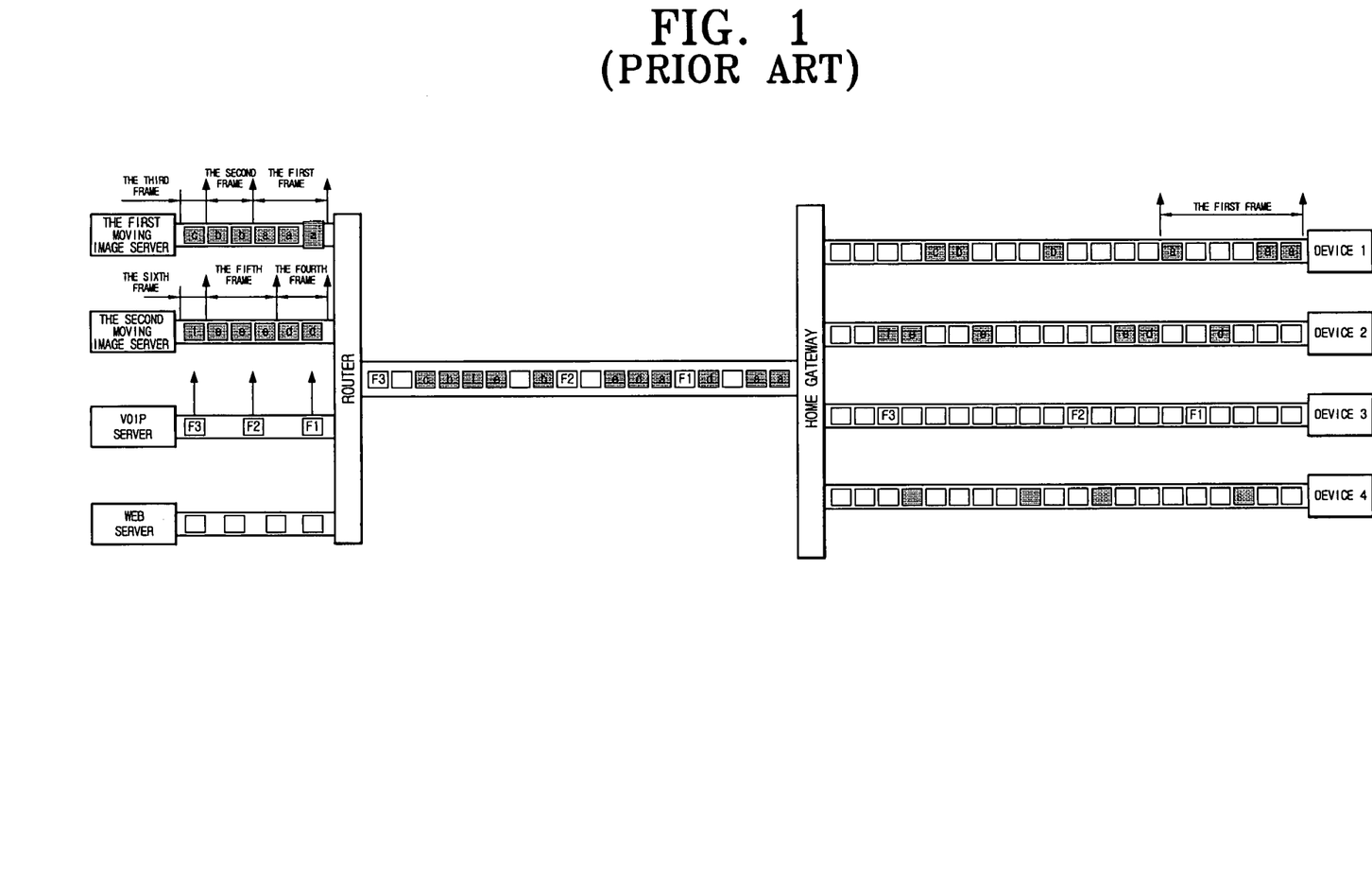
FIG. 1 is a conceptual view of a data transmission process from an outer server to a device according to the first embodiment of the related art.

The related art process of transmitting the packetized data from the outer server to a certain device of the home-network will be explained with reference to FIG. 1.

In a related art home-network system, moving image data, audio data, and web data from the first moving image server, the second moving image server, Voice over Internet Protocol (VoIP) server, and Web server are transmitted via a router to a selected home-network from each of the servers, and the home gateway of the home-network transmits the data to each selected device.

The first moving image server tries to transmit the moving image data with a first frame of three packets a, a second frame of two packets b, and a third frame of one packet c to device 1 of the home-network. The second moving image server tries to transmit to device 2 the moving image data with a fourth frame of two packets d, a fifth frame of three packets e, and a sixth frame of one packet f. The VoIP server for transmitting audio data tries to transmit audio data F1, F2, F3 to device 3, and the web server tries to transmit web data to device 4.

As moving image data, audio data, and web data are delivered to the router from each server, the router outputs each data in real-time in the order of receiving, to transmit to the home gateway. For example, the router first transmits two packets a of the first frame of the first moving image server, transmits one data unit each of the web server and audio data F1, and then transmits the remaining one packet a of the first frame of the first moving image server. If the router transmits data from each server in real-time, a plurality of packets for one frame of the moving image data may be not sequentially transmitted.

If each data is delivered from the router via the IP network to the home gateway, the home gateway transmits the data via wireless network to each device in the home-network. At this time, the home gateway allocates channels in the order of receiving the data to transmit each data. Accordingly, the home gateway allocates two channels to transmit two packets a of the first frame from the first moving image server to the device 1, and then allocates one channel to transmit one packet d of the fourth frame from the second moving image server to the device 2. Then, the home gateway allocates one channel to transmit audio data F1 from the VoIP server to the device 3, and allocates one remaining packet a of the first frame from the first moving image server to the device 1.

According to the related art real-time data transmission method, two of the three packets of the first frame are firstly transmitted to the device 1, and then the remaining one packet is transmitted after the period of time during which three channels are allocated. Three packets for the first frame do not consecutively arrive at the device 1 but arrive separately, which can cause a delay in the delivery time. If a delay occurs, the probability of data loss may increase, and the data may need to be re-transmitted due to the data loss. Accordingly, the amount of data that must be stored in a buffer may increase. Therefore, it may be impossible to reproduce images when desired, or the image quality may suffer due to the delay of the moving image data.

To solve the above related art problems, packet prioritization has been used, in which transmitted data is prioritized.

According to the related art method of packet prioritization, each device of the home-network is prioritized, depending on the capacity of the transmitted data. For example, the device 1 is set to the first priority with data capacity of several megabytes, and the device 2 is set to the second priority which assures having a smaller data capacity than that of the device 1. The device 3 receives audio data from the VoIP server and is set to the highest priority to receive the audio data in real-time.

Figure 2:
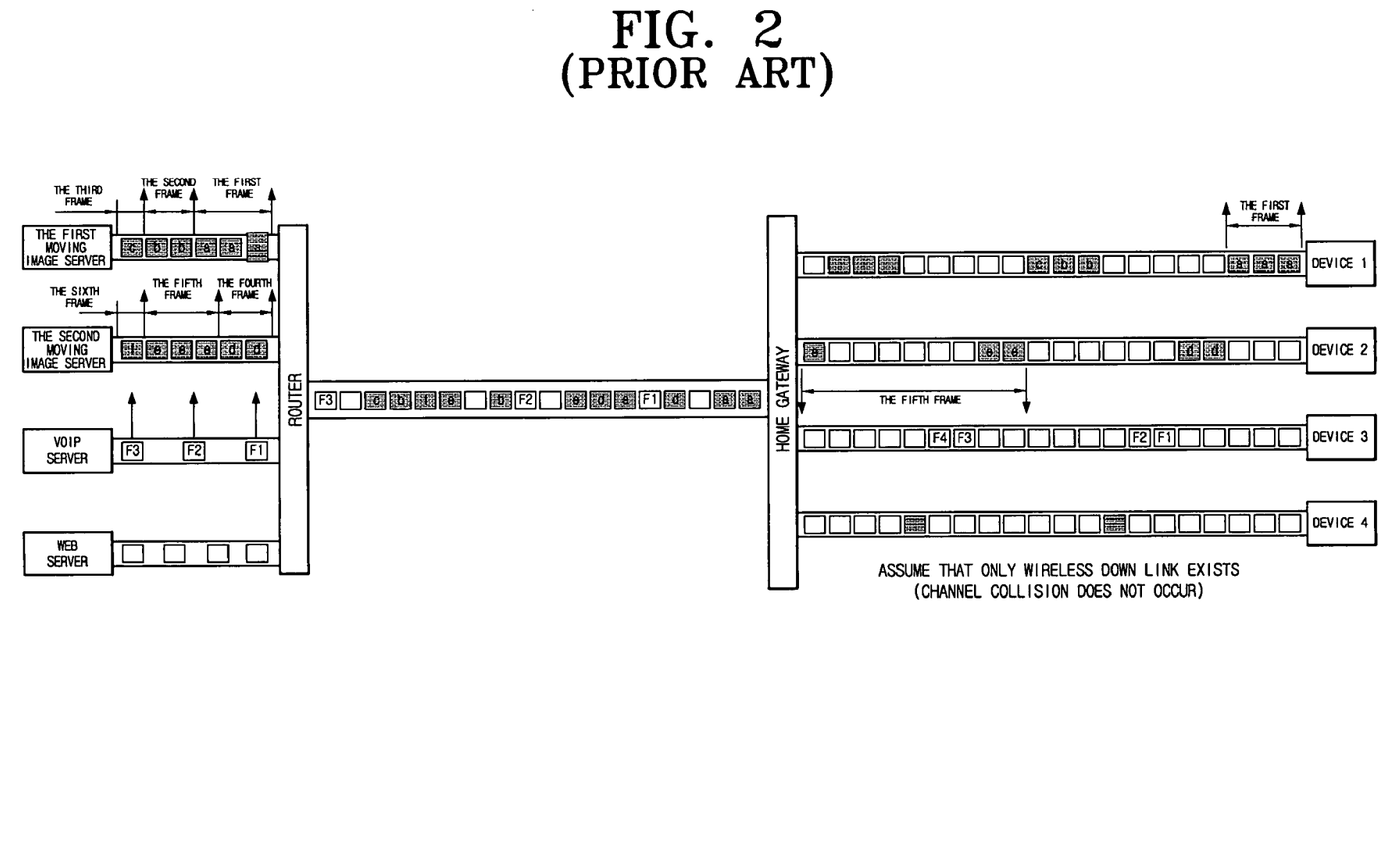
FIG. 2 is a conceptual view of a data transmission process from an outer server to a device according to the second embodiment of the related art.

When priority is set, if moving image data, audio data, and web data are transmitted from each outer server as shown in FIG. 2, a router sequentially arranges each data in the order the data was received and transmits to the home gateway as the related art. The home gateway allocates channels according to the priority of a device to transmit data to each device. First, if the home gateway allocates the number of channels corresponding to the preset data capacity, for example, three channels to the device 1 with the first priority, three packets of the first frame from the first moving image server are transmitted to the device 1.

When the home gateway can allocate the number of channels corresponding to the preset data capacity, for example, two channels for the moving image data from the second moving image server with the second priority, two packets of the fourth frame from the second moving image server are transmitted to the device 2. If the audio data F1, F2 are transmitted from the VoIP server with the highest priority, the home gateway instantly allocates two channels to transmit the audio data to the device 3. If there is no data with higher priority and some channels are available for use, the home gateway allocates the remaining channels for the web data from the web server and transmit them to the device 4.

Likewise, if the data of the second frame and the third frame are received from the first moving image server, the home gateway allocates three channels as preset to transmit at once two packets of the second frame and one packet of the third frame. Then, if data of the fifth frame is received from the second moving image server with the second priority, the home gateway allocates two preset channels to firstly transmit two of three packets of the fifth frame. The home gateway delivers one remaining packet of the fifth frame from the second moving image server only after it first delivers real-time audio data F3, F4 from the VoIP server with the highest priority, web data received from the web server prior to the last packet of the fifth frame, and moving data from the first moving image server.

As described above, according to the related art packet prioritization, data is transmitted to each device depending on preset priority and data capacity. Accordingly, since three channels can be allocated to the device 1, two packets of the second frame and one packet of the third frame are sequentially transmitted to the device 1 despite the fact that they do not need to be transmitted together. On the other hand, since only two channels can be allocated to the device 2, three packets of the fifth frame are transmitted separately as two packets and one packet despite the fact that they need to be delivered together. In other words, when the packet prioritization is applied, an excessive number of channels are allocated to the device with high priority, in spite of the limited number of channels available in a wireless network. This may lead to an unnecessary waste of channels, and a buffer overflow due to excess of buffer capacity allocated to each device.

As the result, the transmission rate of a server may slow down, which can consequently cause unnecessary control signals to be continuously generated. The performance of the device with sub-priority significantly deteriorates due to the small capacity of the data that can be transmitted at once. Even the data transmitted to the device with high priority is not guaranteed to be delivered as a whole frame unit. Therefore, it is very likely that when sequentially transmitting a plurality of frames, a portion of packet of the frame positioned at rear side may not be transmitted together. As the result, delay may occur.

Accordingly, when allocating channels in the home-network system, it is necessary to adaptively allocate channels according to the frame size of data transmitted to the home-network from each outer server, instead of presetting the data capacity and the priority of a device to prevent allocating too many channels to a device with high priority, and decreasing the performance of a device with sub-priority.

SUMMARY OF THE INVENTION

The present invention provides a home-network and a method for allocating channels in which image quality and performance of each device can improve by adaptively allocating channels to each device according to the size of received frame.

According to an aspect of the present invention, there is provided a home-network comprising a buffer with a plurality of queues to temporarily store data to be transmitted to each device, a priority sense part determining if the data transmitted from an outer server has a priority for a transmission and primarily storing the data with a high priority into the queue of the buffer, a frame sense part sensing how many packets are included in one frame of the data stored to the buffer, and a channel allocation part allocating channels in an available channel which one whole frame can be transmitted at once according to the number of packets sensed by the frame sense part.

The packet may include an IP header displaying information on a moving image data, and the IP header may include a frame part displaying a code indicating if the packet is the last one of the frame.

The frame sense part may read the frame part of the packet to determine how many packets are included in the frame.

The channel allocation part may allocate the same number of channels as that of packets.

The channel allocation part may primarily allocate channels to CBR data if one of the queues in the buffer contains CBR data that requires immediate transmission.

The channel allocation part may allocate channels to web data from a web server once channel allocation is completed for the CBR data and the moving image data.

According to another aspect of the present invention, there is provided a method for allocating a channel in a home-network, comprising determining if data of packet unit transmitted from an outer server has a high priority for a transmission, primarily storing the data with a high priority into a buffer with a plurality of queues, sensing how many packets are included in one frame of the data stored to the buffer, allocating channels in an available channel which one whole frame can be transmitted at once according to a number of the sensed packets.

BRIEF DESCRIPTION OF THE DRAWINGS

The above and/or other aspects of the present invention will be more apparent by describing exemplary embodiments with reference to the accompanying drawings, in which.

DETAILED DESCRIPTION OF THE EXEMPLARY EMBODIMENTS

Exemplary embodiments of the present invention will be described in greater detail with reference to the accompanying drawings. In the following description, the same drawing reference numerals are used for the same elements. The matters defined in the description such as a detailed construction and elements are provided to assist in a comprehensive understanding of the invention. Thus, it is apparent that the exemplary embodiments of the present invention can be carried out without those defined matters. Also, well-known functions or constructions are not described in detail since they would obscure the invention in unnecessary detail, and for the sake of brevity and clarity.

Figure 3:
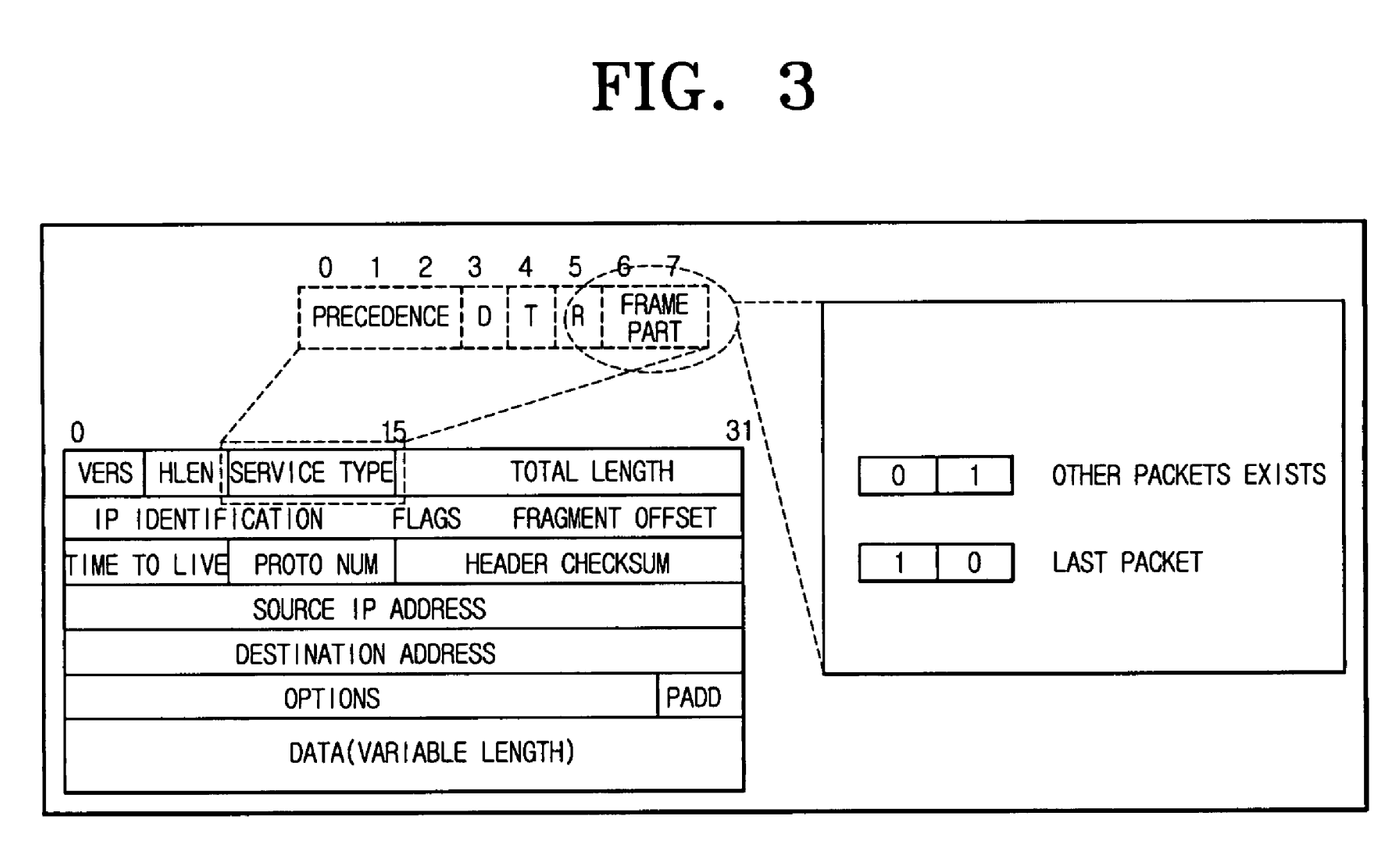
FIG. 3 is a block diagram of an IP header according to an exemplary embodiment.

Generally, data is transmitted in an IP unit when data is transmitted via an IP network, and an IP header contains the information on the data. As shown in FIG. 3, the IP header comprises fields such as a version of the IP, a service type which provides information on a priority of the data, a total length of the data, an identifier (ID) of the IP, source IP address of the data, and a destination IP address of the data.

The service type field displays a code indicating priority according to Quality of Service (QoS), which is a priority policy in a public Internet network. The service type field consists of 8 bits, and comprises a precedence part of 3 bits for displaying whether the data has a priority, a D part for indicating whether the data can be delayed to indicate more detailed information on the priority, a T part, and an R part for displaying reliability indicating whether a packet should be transmitted. The service type field of the IP header of the present home-network further contains a frame part for displaying if other packets exist that have been left. The frame part consists of 2 bits and displays as binary numbers. For example but not by way of limitation, if other packets are left in the frame, the frame part is set to '01', and if the packet is the last one in the frame, '10' may be set.

Figure 4:
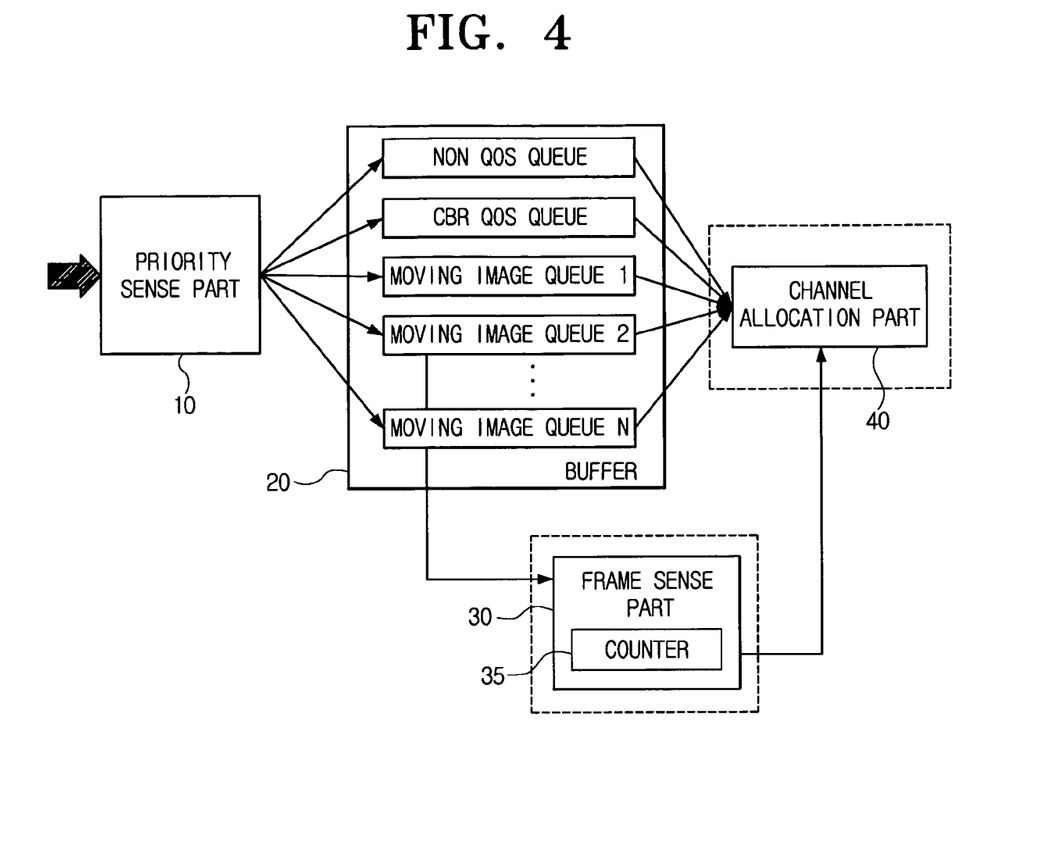
FIG. 4 is a block diagram of a web gateway according to an exemplary embodiment.

The web gateway comprises a priority sense part 10, a buffer 20, a frame sense part 30, a counter 35, and a channel allocation part 40 as shown in FIG. 4, to sense information included in the frame part of the IP header so as to allocate channels to packets transmitted to each device.

The priority sense part 10 senses the precedence, D, T and R parts included in the service type field of the IP header to determine if the input packet has a priority. The priority sense part 10 determines that the web data from the web server has no priority, and that the audio data from the VoIP server has the highest priority so that channels can be allocated accordingly in real-time. With respect to the moving image data with a priority, the priority sense part 10 determines if a queue is preset for the moving image data in the buffer 20. If so, the priority sense part 10 places packets of the moving image data into the queue, and if not, the priority sense part 10 resets a queue for the moving image data to input packets of the moving image data.

The buffer 20 consists of a plurality of queues and assigns web data, audio data, and moving image data to each queue according to the results from the priority sense part 10 to temporarily store the data.

The frame sense part 30 senses the frame part included in the service type field in the IP header to determine the size of a frame by checking if the frame has any more packets left. For example, if '01' is displayed on the frame part of the present-input packet, the frame sense part 30 determines that there exists more packets for the present frame, and if '10' is displayed on the frame part of the present packet, the frame sense part 30 concludes that the packet is the last one of the present frame.

The frame sense part 30 contains a counter 35 for counting the number of packets included in one frame. If the frame part of the packet from the frame sense part 30 is '01', the counter 35 adds 1 to the packet value, and if the frame part of the packet from the frame sense part 30 is '10', the counter 35 adds 1 to the packet value and provides a channel allocation part 40 with the packet value.

The channel allocation part 40 reads in the packet value from the counter 35 to determine how many packets constitute the present frame of moving image data. Then, the channel allocation part 40 allocates channels according to the result. Here, the term 'channels' indicates the amount of data that can be transmitted at once as a packet unit.

Figure 5:
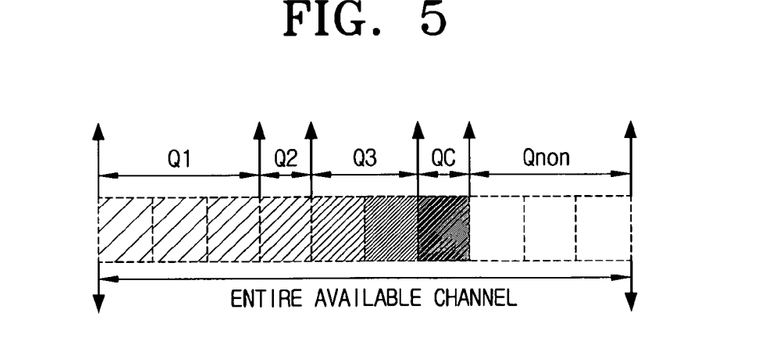
FIG. 5 is a structural view of available channels according to an exemplary embodiment.

For example but not by way of limitation, as shown in FIG. 5, if ten packets can be transmitted at once, the available channel is 10. At this time, if the frame of the moving image data from the first moving image server consists of three packets, the channel allocation part 40 uses three of the ten available channels to transmit the moving image data from the first moving image server. If the frame of the moving image data from the second moving image server consists of one packet, the channel allocation part 40 allocates one channel to the moving image data from the second moving image data server. If the frame of the moving image data from the third moving image server consists of two packets, the channel allocation part 40 allocates two channels to the moving image data from the third moving image server.

The channel allocation part 40 immediately allocates a channel if constant bit rate (CBR) data is input. At this time, one channel is allocated since audio data from the VoIP server, which is CBR data, consists of one IP packet. If channels are allocated to the moving image data from each moving image server and the CBR data, the channel allocation part 40 allocates any remaining channels to data with low priority such as the web data from the web server.

Figure 6:
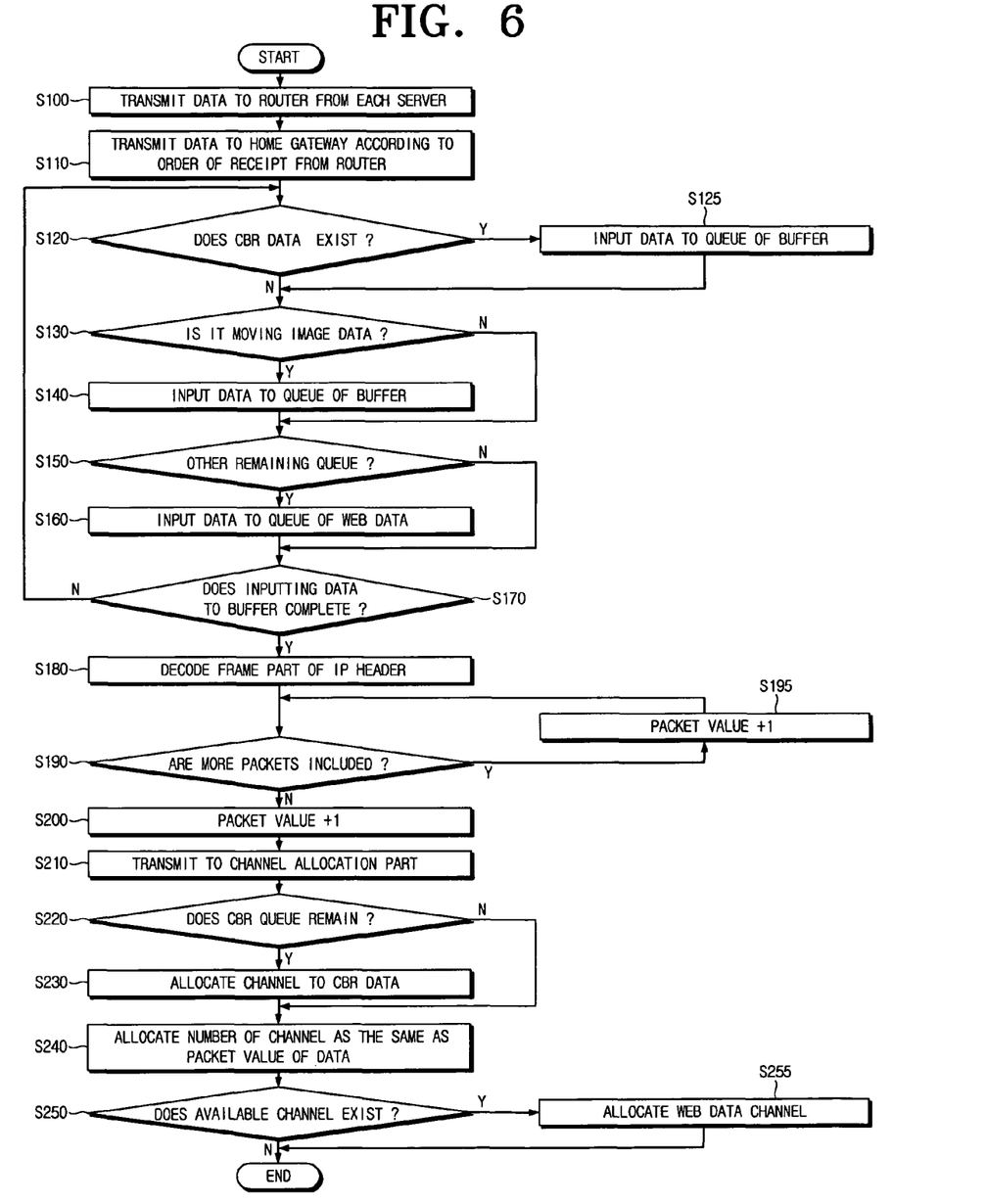
FIG. 6 is a flowchart of the process of allocating moving image channel in a home-network according to an exemplary embodiment.

Next, the process of data channel allocation in the network system will be explained with reference to FIGS. 6 and 7 hereinafter.

The first moving image server transmits the moving image data with the first frame consisting of three packets a, the second frame consisting of two packets b, and the third frame consisting of one packet c to the device 1 of the home-network. The second moving image server tries to transmit to the device 2 the moving image data with the fourth frame consisting of two packets d, the fifth frame consisting of three packets e, and the sixth frame consisting of one packet f. The VoIP server for transmitting audio data attempts to transmit the audio data F1, F2, and F3 to the device 3, and the web server transmits web data to the device 4.

If the moving image data, the audio data, and the web data from each server arrive at the router (S100), the router transmits each data to the home gateway in the order of arrival (S110). The router first transmits two packets a of the first frame of the first moving image server, and then one unit of the data from the web server and the audio data F1. Finally, the remaining one packet a of the first frame from the first moving image server is transmitted.

If each data is sequentially input from the router, the priority sense part 10 of the home gateway reads the precedence part, D, T, R part included in the service type field in the IP header of the data and determines if the data included in the input IP is CBR data or has a high priority (S120).

If the input data is CBR data such as audio data, the priority sense part 10 primarily inputs the data to the queue of the buffer 20 (S125). If the data is not CBR data, the priority sense part 10 determines if the data is a moving image data with a high priority (S130).

If the data is moving image data with a high priority, the priority sense part 10 inputs the data to the queue if the queue for moving image data exists in the buffer 20. If no queue for moving image data exists in the buffer 20, the priority sense part 10 generates a queue and inputs the moving image data into it (S140).

If there are any other queues remaining (S150), the priority sense part 10 inputs data with a low priority, such as web data, into those remaining queues (S160). If there is no other remaining queue, then operation S160 is skipped.

If data input into the queue of the buffer 20 (S170) has been completed, the frame sense part 30 takes data from the buffer 20 to read (i.e., decode) the frame part of the service type field of the IP header (S180). If the data input has not yet been completed, then operations S120-s170 are performed until data input has been completed.

If it is determined that the frame of the transmitted moving image data includes other packets than the present one (S190), in other words, if the code of the frame part is '01', the counter 35 adds 1 to the packet value (S195), and operations S190 and S195 are repeated until it is determined that there are no more packets.

For example, but not by way of limitation, if the code of the frame part is '10' (i.e., there are no more packets), the counter 35 adds 1 to the packet value and then provides the channel allocation part 40 with the packet value (S200, S210).

The channel allocation part 40 determines if the CBR queue exists in the buffer 20 (S220), and if so, allocates the CBR data to the available channel (S230). If the CBR queue is determined to not exist at operation S220, then operation S230 is skipped. After allocating the CBR data to the channels, the channel allocation part 40 senses the packet value of the data included in the input queue and allocates the substantially same number of channels as the packet values.

If no CBR queue exists in the buffer 20, the channel allocation part 40 also senses the packet value of the data included in the input queue and allocates the substantially same number of channels as the packet values of the data (S240).

Likewise, the channel allocation part 40 allocates channels to the data transmitted from the other servers and checks if there any other empty channels are available (S250).

If other empty channels are determined to be available, the channel allocation part 40 allocates the remaining available channels to the packets of low priority data, such as web data (S255). If not, operation S255 is skipped.

Figure 7:
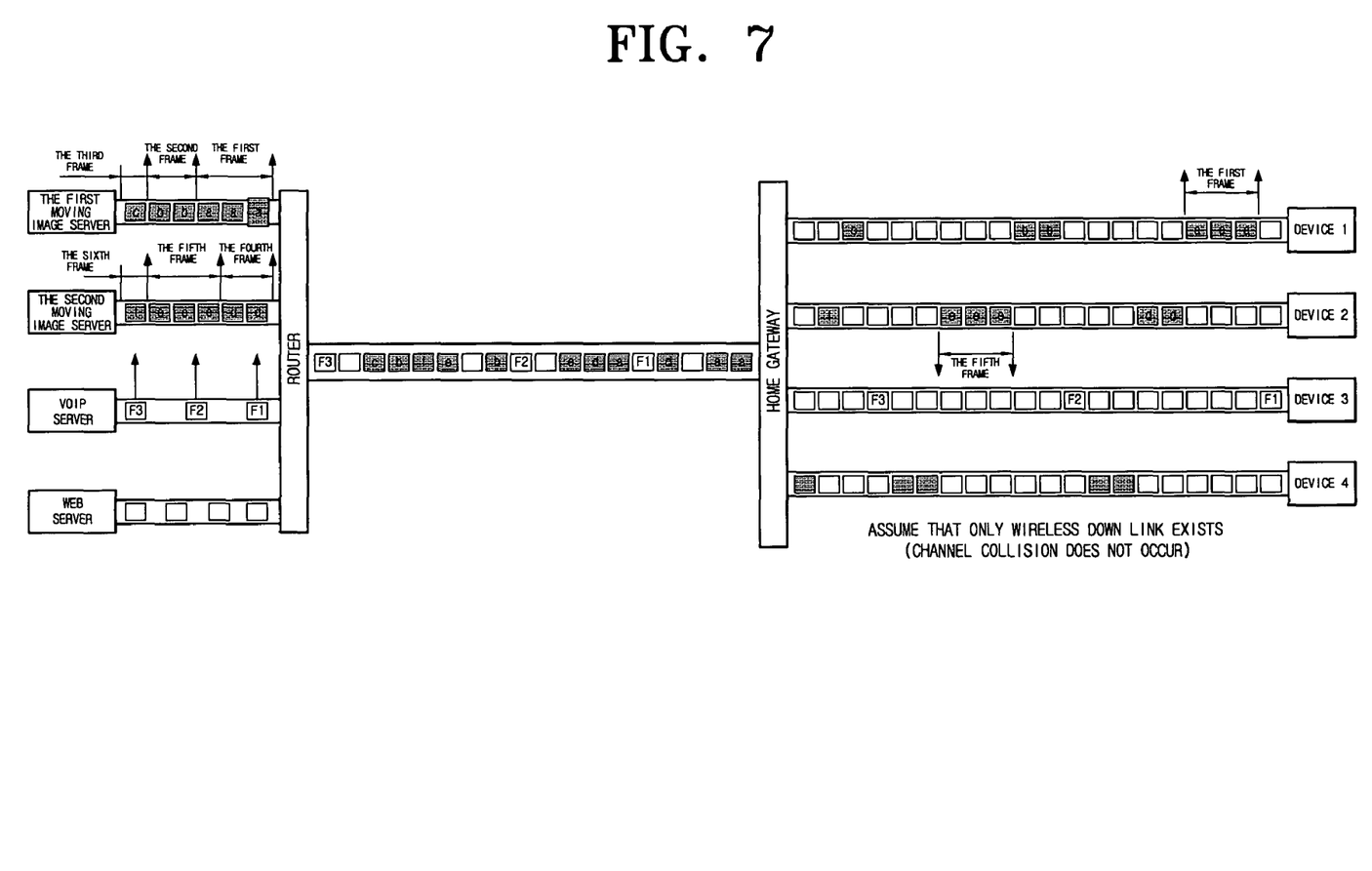
FIG. 7 is a conceptual view of a data transmission process in which the method for allocating channels is applied according to an exemplary embodiment.

For example but not by way of limitation, if the audio data F1 from the VoIP server exists as shown in FIG. 7, the channel allocation part 40 first allocates channels to the audio data F1. Since the first frame from the first moving image server consists of three packets, the channel allocation part 40 allocates three of the eight available channels to the device 1 to sequentially transmit three packets a of the first frame. Since two packets d input in the queue forms the fourth frame from the second moving image server, the channel allocation part 40 allocates two channels to the device 2 to transmit the fourth frame. Finally, the channel allocation part 40 allocates and transmits low-priority web data from the web server to the remaining two of the eight available channels. In this way, all the packets in each frame of the moving image data can be sequentially transmitted as a whole.

As described above, in the home-network system according to exemplary embodiments, if data consists of a frame with a plurality of packets such as the moving image data, each server inserts into the IP header the information on how many packets form one frame, and the home gateway reads in the information on the number of packets in one frame and allocates channels according to the number of packets. The delay time of wireless data can be substantially reduced by sequentially transmitting all the packets in one frame to the device. Accordingly, image quality of moving image service can be improved. A steep performance decrease in the device with a low priority formed in the related art priority allocation method can be substantially prevented by allocating channels according to the order of receipt of data.

Additionally, the foregoing methods of the exemplary embodiment may be implemented in a computer readable medium, or a data carrier. More specifically, the computer-readable medium includes a set of instructions (e.g., computer program). The instructions include the operations discussed with respect to the foregoing methods. As a result, the present invention can be implemented as software, in addition to the foregoing disclosure.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A home-network comprising:
   a buffer with a plurality of queues that temporarily store data to be transmitted to each of a plurality of devices;
   a priority sense part that determines if data transmitted from an external server has a priority for a transmission, and stores the data with a high priority into one of the queues of the buffer;
   a frame sense part that senses a number of packets included in a frame of the data stored in the buffer based on a frame part, wherein the frame includes at least one packet; and
   a channel allocation part that allocates, from total available channels, a number of channels equal to the number of packets included in the frame, sensed by the frame sense part, such that the packets included in the frame can be transmitted at a substantially same time and sequentially transmitted as a whole,
   wherein the frame part displays a code indicative of the last packet of the frame and is included in an Internet Protocol (IP) header,
   wherein the channel allocation part allocates the remaining channels of total available channels to other transmission.

2. The home-network according to claim 1, wherein the packet comprises the IP header including information on moving image data.

3. The home-network according to claim 2, wherein the frame sense part reads the frame part of the packet to determine the number of packets in the frame.

4. The home-network of claim 2, wherein the priority sense part determines if data transmitted from an external server has a priority for a transmission by sensing a code indicating priority according to Quality of Service (QoS) in a service type field in the IP header.

5. The home-network according to claim 1, wherein the channel allocation part primarily allocates channels to constant bit rate (CBR) data if one of the queues in the buffer contains CBR data that requires substantially immediate transmission.

6. The home-network according to claim 5, wherein the channel allocation part allocates channels to web data from a web server if channel allocation has been completed for the CBR data and moving image data.

7. The home-network of claim 1, wherein the plurality of devices are members of the home-network.

8. A method for allocating a channel in a home-network, the method comprising:
   determining if data of packet unit transmitted from an external server has a high priority for transmission;
   primarily storing the data with the high priority into a buffer having a plurality of queues;
   sensing a number of packets included in a frame of the data stored to the buffer based on a frame part, wherein the frame includes at least one packet; and
   allocating, from total available channels, a number of channels equal to the sensed number of packets included in the frame, such that the packets included in the frame can be transmitted at a substantially same time and sequentially transmitted as a whole,
   wherein the frame part displays a code indicative of the last packet of the frame and is included in an Internet Protocol (IP) header,
   wherein the allocating allocates the remaining channels of total available channels to other transmission.

9. The method according to claim 8, wherein the packet includes the IP header displaying information on the data.

10. The method according to claim 9, wherein the sensing comprises reading the frame part of the packet to sense the number of packets included in the frame.

11. The method according to claim 8, wherein the allocating further comprises if one of the queues in the buffer contains constant bit rate (CBR) data that requires immediate transmission, primarily allocating the channels to the CBR data.

12. The method according to claim 11, wherein the allocating the channel further comprises allocating channels to web data from a web server once the channel allocation is completed for the CBR data and moving image data.

13. A non-transitory computer-readable medium for storing a program for allocating a channel in a home-network, the method comprising:
  determining if data of packet unit transmitted from an external server has a high priority for transmission;
  primarily storing the data with the high priority into a buffer having a plurality of queues;
  sensing a number of packets included in a frame of the data stored to the buffer based on a frame part, wherein the frame includes at least one packet; and
  allocating, from total available channels, number of channels equal to the sensed number of packets included in the frame, such that the packets included in the frame can be transmitted at a substantially same time and sequentially transmitted as a whole,
  wherein the frame part displays a code indicative of the last packet of the frame and is included in an Internet Protocol (IP) header,
  wherein the allocating allocates the remaining channels of total available channels to other transmission.

14. The computer-readable medium of claim 13, wherein the packet includes the IP header displaying information on the data.

15. The computer-readable medium of claim 14, wherein the sensing comprises reading the frame part of the packet to sense the number of packets included in the frame.

16. The computer-readable medium of claim 13, wherein the allocating further comprises if one of the queues in the buffer contains constant bit rate (CBR) data that requires immediate transmission, primarily allocating the channels to the CBR data.

17. The computer-readable medium of claim 16, wherein the allocating the channel further comprises allocating channels to web data from a web server once the channel allocation is completed for the CBR data and moving image data.

* * * * *